United States Patent Office 3,546,147
Patented Dec. 8, 1970

3,546,147
BINDERS FOR THE PRODUCTION OF PROCESSED WOOD MATERIALS COMPRISING CYCLIC ACETALS
Bruno Sander, Ludwigshafen (Rhine), Friedrich Becke, Heidelberg, Helmuth Hagen, Ludwigshafen (Rhine), Ernst-Heinrich Pommer, Limburgerhof, Pfalz, and Otto Wittmann, Ludwigshafen (Rhine), Germany, assignors to Badische Anilin- & Soda Fabrik Aktiengesellschaft, Ludwigshafen (Rhine), Germany
No Drawing. Filed Jan. 19, 1968, Ser. No. 699,061
Claims priority, application Germany, Jan. 24, 1967, B 90,864
Int. Cl. C08g 37/08, 37/24
U.S. Cl. 260—17.2      5 Claims

ABSTRACT OF THE DISCLOSURE

Binders for the production of processed wood materials and based on mixtures of wood adhesives, wood preservatives and organic solvents which additionally contain a cyclic acetal of an aliphatic diol having five to eight ring members; and processed wood materials prepared therewith.

---

The invention relates to improved binders for the production of processed wood materials which are resistant to damage by animals or attack by microorganisms.

Mainly binders based on aminoplast or phenoplast resins are used for the production of processed wood materials, such as plywood and chipboard. In order to obtain materials which are resistant to damage by animals or attack by microorganisms, wood preservatives are added to the binders and are distributed in the wood substance during or after the manufacture of the wood material. Most of the preservatives are not soluble in the binder solutions so that they are advantageously dispersed in the binder in the form of a solution in an organic solvent. It has proved to be advantageous to add to the binder containing the wood preservative, a coagulant to ensure that when the binder mixture is heated during the production of the wood material the binder coagulates homogeneously. It is distributed on the surface while the liquid phase containing the wood preservative penetrates into the wood substance. Uniform distribution of the wood preservatives in the wood is achieved in this way. Polyalkylene oxides and adducts of ethylene oxide to long-chain alcohols or phenols have proved to be particularly suitable as coagulants. It has been found however that when using such coagulants, certain properties of the wood material, as for example its strength, are detrimentally affected.

The object of the present invention is to provide improved binders for the production of processed wood materials based on conventional wood adhesives, wood preservatives and organic solvents which have the disadvantages to a lesser extent if at all. It is a particular object of the invention to provide binders of the said type which combine good fungicidal action with good strength properties and low swelling values of wood materials prepared therewith.

We have now found that binders for the production of processed wood materials based on a mixture of a synthetic wood adhesive derived from an aminoplast and/or phenoplast, a wood preservative and an organic solvent have particularly advantageous properties when the mixture also contains a cyclic acetal having five to eight ring atoms and having the general formula:

in which R denotes

and $R^1$ denotes the divalent radical of an aliphatic diol and $R^2$ may denote a hydrogen atom or an alkyl group having 1 to 4 carbon atoms.

We have further found that wood materials, particularly plywood and chipboard, which have been prepared in a conventional way using binders based on mixtures of synthetic wood adhesives derived from aminoplasts and/or phenoplasts and organic solvents, have particularly advantageous properties when a cyclic compound of the above-mentioned type is added to the binders.

Among the synthetic wood adhesives based on aminoplasts and/or phenoplasts, urea-formaldehyde, melamine-formaldehyde or phenolformaldehyde condensates conventionally used as wood adhesives are particularly suitable. These synthetic resins are in the form of an aqueous solution or dispersion. For the production of processed wood materials, aqueous solutions or dispersions which contain 20 to 75% by weight of the synthetic resin or precondensate are usually employed.

Wood preservatives are intended to include substances which protect the wood material from attack by microorganisms and prevent it from being damaged by animals, particularly insects. These substances are particularly salts of N-nitroso-N-organylhydroxylamines, preferably the calcium salt of N-nitroso-N-cyclohexylhydroxylamine, and also pentachlorophenol or salts of pentachlorophenol, particularly sodium pentachlorophenolate, hexachlorocyclohexane, and thiophosphoric esters. Mixtures of wood preservatives may also be used.

The wood preservatives are advantageously used dissolved in organic solvents. Examples of suitable solvents are the various glycol ethers and gas oils, and also mixtures of solvents. Glycol monoalkyl ethers, as for example ethylene glycol monomethyl ether, are particularly suitable. It is advantageous to use solutions which contain 5 to 50% by weight of the wood preservative dissolved therein.

In addition to the synthetic wood adhesive, the wood preservative and the organic solvent, the binder mixtures according to the invention contain, advantageously in an amount of 1 to 60% and particularly 20 to 40% by weight, with reference to the solids content of the synthetic wood adhesive, a cyclic acetal of the said type containing five to eight ring atoms. Cyclic compounds are particularly suitable in which $R^2$ denotes a hydrogen atom and the radical $R^1$ denotes the divalent radical of an aliphatic diol. Among cyclic acetals of an aliphatic diol, which preferably contains two to five carbon atoms, the following are particularly suitable: 4-chloromethyl-4-methyl-1,3-dioxane, butanediol-1,4-formal and the corresponding acetal of acetaldehyde (butanediol-1,4-acetal), butene-2-diol-1,4-formal, butyne-2-diol-1,4-formal, diethylene glycol formal, 4-methoxydioxolane and particularly 1,3-dioxolane and 1,3-dioxane. Mixtures of cyclic compounds of the said type may also be used.

The binder advantageously contains (with reference to the solids content of the synthetic wood adhesive) 0.5 to 40% by weight of wood preservative, 5 to 60% by weight of an organic solvent and 1 to 60%, particularly 20 to 40%, by weight of one of the said cyclic compounds.

The amount of binder used for the production of the wood material is such that the amount of resin contained in the binder corresponds to the conventional amounts for the production of processed wood materials. Thus for example for the production of plywood an amount of binder is used such that 50 to 120 g. of solid resin is present per square meter of adhesive surface. Chipboards are prepared with such an amount of binder that 5 to 15% by weight of solid resin is present based on absolutely dry chips.

It has been found that the wood preservatives are uniformly distributed in wood materials prepared while using binders according to this invention. The modified wood materials have the same or better strength properties and lower swelling values than those obtained without wood preservatives according to this invention. Binders according to this invention thus offer an advantage over prior art binders which contain wood preservatives.

The invention is further illustrated by the following examples in which parts and percentages are by weight.

EXAMPLES 1 AND 2

In each case 100 parts of a wood adhesive based on a urea-formaldehyde condensate (molar ratio 1:1.6) which contain 50% of solids in aqueous solution is mixed with 0.85 part of ammonium chloride and 0.85 part of urea which are dissolved in 8.3 parts of water and with 12.5 parts of a solution containing 10% of the calcium salt of N-nitroso-N-cyclohexylhydroxylamine (fungicide), 60% of ethylene glycol monomethyl ether and 30% of one of the following cyclic acetals: 4-chloromethyl-4-methyl-1,3-dioxane in Example 1, 1,3-dioxolane in Example 2.

Testing the binder for fungal attack

Wood chips are glued with the binder mixture of Example 1 or 2, the amount of binder used in each case being such that 8 parts of resin (dry weight) is present for 100 parts of chips.

The chips coated with binder are pressed at a temperature of 150° C. into chipboards having a thickness of 19 mm.

To determine resistance of mold chipboard test specimens having the dimensions 25 mm. x 17 mm. x 10 mm. are placed in Petri dishes on a 5% biomalt nutrient agar which has been artificially infected with spores of the mold *Aspergillus niger* or *Trichoderma viride*. The Petri dishes containing the specimens are incubated for a period of fourteen days at a temperature of 30° C., after which the extent of fungal development on the specimens and the intensity of fungus growth on the nutrient agar are assayed.

To determine resistance to wood-destroying fungi, test specimens of the same size as specified above are placed on slabs of biomalt nutrient agar which are covered with wood-destroying fungus *Coniophora cerebella*. After incubating the dishes at 22° C. for four weeks, the extent of fungus development on the test specimens is assayed. The results are collected in Table 1 in which the following abbreviations are used:

AN(TS)=Extent of development of *Aspergillus niger* on test specimen after fourteen days;
AN(NA)=Extent of development of *Aspergillus niger* on nutrient agar after fourteen days;
TV(TS)=Extent of development of *Trichoderma viride* on test specimen after fourteen days;
TV(NA)=Extent of development of *Trichoderma viride* on nutrient agar after fourteen days;
Coniophora=Extent of development of *Coniophora cerebella* on test specimen after four weeks;
Binder 1 or 2 resp.=Binder according to Example 1 or 2 resp.;
Control=Control without fungicide solution;
(−)=Test specimen free from fungus;
(+)=Traces of fungus development;
(++)=Vigorous fungus development;
(+++)=Uninhibited fungus development.

TABLE I

| Test specimen glued with | AN(TS) | AN(NA) | TV(TS) | TV(NA) | Coniophora |
|---|---|---|---|---|---|
| Binder 1 | (−) | (+++) | (+) | (++) | (−) |
| Binder 2 | (−) | (+++) | (+) | (++) | (−) |
| Control | (+++) | (+++) | (+++) | (+++) | (+++) |

EXAMPLES 3 AND 4—With comparison experiments

Testing the binders for tensile strength and swelling (a) Chipboards are prepared with the binder mixture of Example 2. Transverse tensile strength and swelling in thickness are determined on test specimens.

For comparison, the transverse tensile strength and swelling in thickness are also determined on chipboards which have been prepared with a fungicide solution and which contain an equal amount of an adduct of 32 moles of ethylene oxide to a fatty alcohol (sixteen to eighteen carbon atoms) instead of 1,3-dioxolane.

(b) Transverse tensile strengths are also determined on test chipboards which have been obtained using a binder based on a phenol-formaldehyde condensate and the above-mentioned fungicide solution (corresponding to Example 2). The results of determining transverse tensile strength and swelling in thickness when 1,3-dioxolane or the above specified ethylene oxide adduct is added are collected in Table 2 in which the following abbreviations are used:

WG=Wood glue;
UF=Urea-formaldehyde condensate;
PF=Phenol-formaldehyde condensate;
Additive=Additive in fungicide solution;
Dioxolane=1,3-dioxolane;
Adduct=Adduct of 32 moles of ethylene oxide to fatty alcohol;
TTS20 (100)=Transverse tensile strength in kg./sq. cm.;
Swelling=Swelling in thickness in percent after twenty-four hours (matured boards).

TABLE 2

| WG | Additive | TTS20 | TTS100 | Swellin |
|---|---|---|---|---|
| UF | | 5.8 | | 16.5 |
| UF | Dioxolane | 6.1 | | 11.9 |
| UF | Adduct | 4.6 | | 13.2 |
| PF | | 5.8 | 2.5 | 11.5 |
| PF | Dioxolane | 6.8 | 3.2 | 9.3 |
| PF | Adduct | 4.5 | 1.4 | 10.3 |

We claim:

1. A binder for the production of processed wood materials consisting essentially of a mixture of (a) a synthetic wood adhesive selected from the group consisting of urea-formaldehyde, melamine-formaldehyde and phenol-formaldehyde condensates or mixtures thereof, (b) a wood preservative, (c) an organic solvent and (d) about 1 to 60% by weight, with reference to the solids content of said synthetic wood adhesive, of a cyclic acetal having five to eight ring atoms and having the formula

where R denotes

$R^1$ denotes the divalent radical of an aliphatic diol, and $R^2$ denotes a hydrogen atom or an alkyl group having 1 to 4 carbon atoms.

2. A binder as claimed in claim 1 which contains 1,3-dioxolane as the cyclic acetal.

3. A binder as claimed in claim 1 which contains 4-chloromethyl-4-methyl-1,3-dioxane as the cyclic acetal.

4. A binder as claimed in claim 1 which contains 20 to 40% by weight of a cyclic acetal, with reference to the solids content of the synthetic wood adhesive.

5. A binder as claimed in claim 1 which contains (with reference to the solids content of the synthetic wood adhesive) 0.5 to 40% by weight of wood perspective, 5 to 60% by weight of an organic solvent and 1 to 60% by weight of cyclic acetal.

References Cited

UNITED STATES PATENTS

| | | | |
|---|---|---|---|
| 2,615,003 | 10/1952 | Suen et al. | 260—17.3 |
| 3,140,296 | 7/1964 | McClure | 260—30.4 |
| 3,351,485 | 11/1967 | Langner | 117—147 |
| 3,389,112 | 6/1968 | Nordstrom | 260—30.4 |

OTHER REFERENCES

Chem. Abstracts, vol. 53: 22711 g, Schmitz-Hillebrecht et al., "Molded Bodies, Especially Plywood, Containing Wood Preservatives."

Chem. Abstracts, vol. 66: 20165 y, Wilhelmi et al., "Impregnation of Wood Chips."

WILLIAM SHORT, Primary Examiner

E. WOODBERRY, Assistant Examiner

U.S. Cl. X.R.

260—17.2, 17.3, 29.3, 29.4, 59

PO-1050
(5/69)

UNITED STATES PATENT OFFICE
CERTIFICATE OF CORRECTION

Patent No. 3,546,147        Dated December 8, 1970

Inventor(s) Bruno Sander et al

It is certified that error appears in the above-identified patent and that said Letters Patent are hereby corrected as shown below:

Column 5, line 6, "perspective" should read -- preservative

SIGNED AND
SEALED

FEB 23 1971

(SEAL)
Attest:

Edward M. Fletcher, Jr.
Attesting Officer

WILLIAM E. SCHUYLER, JR
Commissioner of Patents